US005907618A

United States Patent [19]
Gennaro et al.

[11] Patent Number: 5,907,618
[45] Date of Patent: May 25, 1999

[54] METHOD AND APPARATUS FOR VERIFIABLY PROVIDING KEY RECOVERY INFORMATION IN A CRYPTOGRAPHIC SYSTEM

[75] Inventors: Rosario Gennaro, New York City; Paul Ashley Karger, Chappaqua; Stephen Michael Matyas, Jr., Poughkeepsie, all of N.Y.; Mohammad Peyravian, Cary, N.C.; David Robert Safford, Brewster; Nevenko Zunic, Wappingers Falls, both of N.Y.

[73] Assignee: International Business Machines Corporation, Armonk, N.Y.

[21] Appl. No.: 08/775,348

[22] Filed: Jan. 3, 1997

[51] Int. Cl.⁶ ............................................ H04L 9/00
[52] U.S. Cl. ................................. 380/21; 380/30
[58] Field of Search ........................ 380/21, 30, 28, 380/49, 59

[56] References Cited

U.S. PATENT DOCUMENTS

| | | | |
|---|---|---|---|
| 4,200,770 | 4/1980 | Hellman et al. | 178/22 |
| 5,276,737 | 1/1994 | Micali | 380/30 |
| 5,315,658 | 5/1994 | Micali | 380/30 |
| 5,557,765 | 9/1996 | Lipner | 380/21 |
| 5,796,830 | 8/1996 | Johnson et al. | 380/21 |

OTHER PUBLICATIONS

"A Taxonomy for Key Escrow Encryption System", D. E. Denning et al., Communication of the ACM, vol. 39, No. 3, Mar. 1996, pp. 34–40.

"Alternatives to RSA Using Diffie–Hellman With DSS", (1996), pub. at http://www.cylink.com/products/security/rsa/rsa–dss2.htm.

"A Taxonomy for Key Escrow Encryption System", D. E. Denning et al., Communications of the ACM, vol. 39, No. 3, Mar. 1996, pp. 34–40.

"Alterantives To RSA Using Diffie–Hellman With DSS", (1996), pub. at http://www.cylink.com/products/security/rsa/rsa.dss2.htm.

"Binding Cryptography. A fraud–detectible alternative to key–escrow proposals", E. Verheul et at., (1996), published at http://cwix.kub.nl./˜frw/people/koops/binding.htm.

"Binding the ElGamal Encryption Scheme", E. Verheul et al., (1996), published at http://cwis.dub.nl/˜frw/people/koops/bindtech.htm.

"New Directions in Cryptography", IEEE Transactions on Information Theory, vol. IT–22, No. 6, Nov. 1976, pp. 644–654.

"To Tap or Not To Tap", D. Denning, Communications of the ACM, vol. 36, No. 3, Mar. 1993, pp. 26–33.

*Primary Examiner*—Tod R. Swann
*Assistant Examiner*—Trevor Coddington
*Attorney, Agent, or Firm*—William A. Kinnaman, Jr.

[57] ABSTRACT

A method and apparatus for verifiably providing key recovery information to one or more trustees in a cryptographic communication system having a sender and a receiver Each communicating party has its own Diffie-Hellman key pair comprising a secret value and corresponding public value, as does each trustee The sender non-interactively generates from its own secret value and the public value held by the receiver a first shared Diffie-Hellman key pair comprising a first shared secret value, shared with the receiver but not with any trustee, and a corresponding public value. For each trustee, the sender then non-interactively generates an additional shared secret value, shared with the receiver and the trustee, from the first shared secret value and the public value corresponding to the secret value held by the trustee. The sender uses the additional shared secret value to encrypt recovery information for each trustee, which is transmitted to the receiver along with the encrypted message. Each trustee can decrypt its recovery information by regenerating its additional shared secret value from its own secret value and the public value of the first shared Diffie-Hellman key pair. The receiver can verify the correctness of the recovery information for each trustee by decrypting the information using the additional shared secret value for that trustee, without having to recreate the recovery information or perform computationally expensive public key operations.

59 Claims, 8 Drawing Sheets

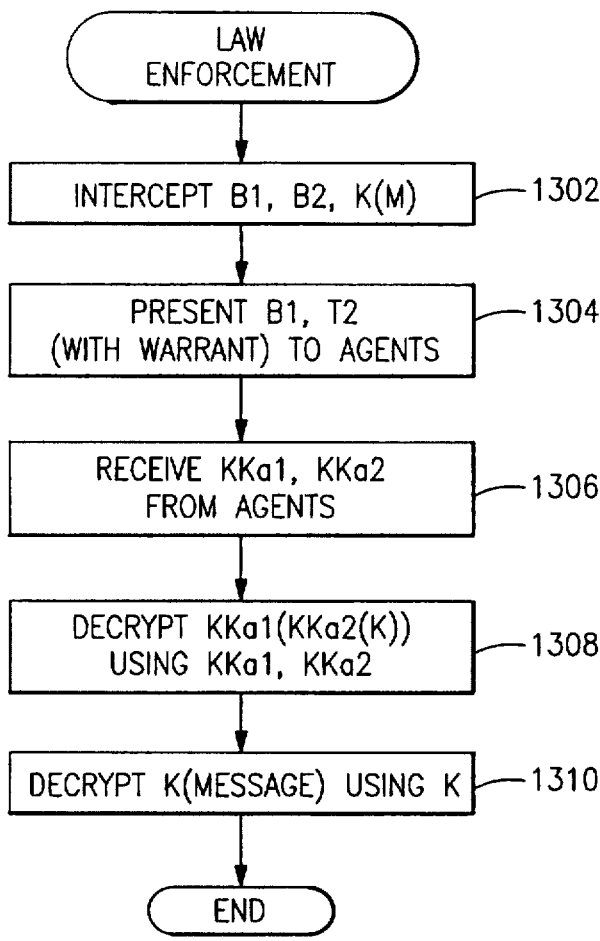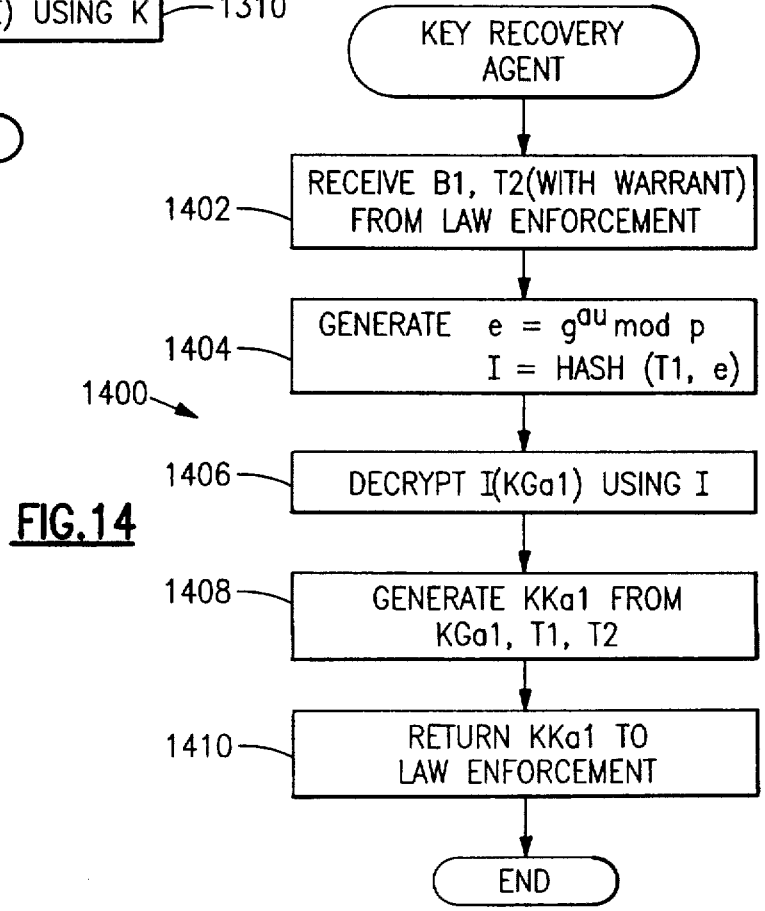

METHOD AND APPARATUS FOR VERIFIABLY PROVIDING KEY RECOVERY INFORMATION IN A CRYPTOGRAPHIC SYSTEM

BACKGROUND OF THE INVENTION

1. Field of the Invention

This invention relates to a cryptographic key recovery system and, more particularly, to a method and apparatus for verifying the correctness of key recovery information within a cryptographic key recovery system.

2. Description of the Related Art

Data encryption systems are well known in the data processing art. In general, such systems operate by performing an encryption operation on a plaintext input block, using an encryption key, to produce a ciphertext output block. The receiver of an encrypted message performs a corresponding decryption operation, using a decryption key, to recover the plaintext block.

Encryption systems fall into two general categories. Symmetric (or private key) encryption systems such as the Data Encryption Standard (DES) system use the same secret key for both encrypting and decrypting messages. In the DES system, a key having 56 independently specifiable bits is used to convert 64-bit plaintext blocks to ciphertext blocks, or vice versa.

Asymmetric (or public key) encryption systems, on the other hand, use different keys that are not feasibly derivable from one another for encryption and decryption. A person wishing to receive messages generates a pair of corresponding encryption and decryption keys. The encryption key is made public, while the corresponding decryption key is kept secret. Anyone wishing to communicate with the receiver may encrypt a message using the receiver's public key. Only the receiver may decrypt the message, however, since only he has the private key. Perhaps the best-known asymmetric encryption system is the RSA encryption system, named after its originators Rivest, Shamir and Adleman.

Asymmetric encryption systems are generally more computationally intensive than symmetric encryption systems, but have the advantage that they do not require a secure channel for the transmission of encryption keys. For this reason, asymmetric encryption systems are often used for the one-time transport of highly sensitive data such as symmetric encryption keys.

Data encryption systems of all types have attracted the attention of government intelligence agencies and law enforcement agencies, since the same cryptographic strength that prevents decryption by unauthorized third parties also prevents decryption by intelligence or law enforcement officials having a legitimate reason for wanting to access the plaintext data. Because of such concerns, governments have either prohibited the use or export of strong encryption systems or have conditioned their approval on the use of weakened keys that are susceptible to key-exhaustion attacks (i.e., systematically testing all possible keys until the right one is found). Such weak encryption systems have the obvious disadvantage that they are just as vulnerable to unauthorized third parties as they are to authorized government officials.

Various cryptographic key recovery systems have recently been proposed as a compromise between the demands of communicating parties for privacy in electronic communications and the demands of law enforcement agencies for access to such communications when necessary to uncover crimes or threats to national security. Generally, in such key recovery systems, all or part of the key used by the communicating parties is made available to one or more key recovery agents, either by actually giving key portions to the key recovery agents (in which case the key portions are said to be "escrowed") or by providing sufficient information in the communication itself (as by encrypting the key portions) to allow the key recovery agents to regenerate the key portions. Key recovery agents would reveal the escrowed or regenerated key portions to a requesting law enforcement agent only upon presentation of proper evidence of authority, such as a court order authorizing the interception. The use of multiple key recovery agents, all of which must cooperate to recover the key, minimizes the possibility that a law enforcement agent can improperly recover a key by using a corrupt key recovery agent.

Key recovery systems serve the communicants' interest in privacy, since their encryption system retains its full strength against third parties and does not have to be weakened to comply with domestic restrictions on encryption or to meet export requirements. At the same, key recovery systems serve the legitimate needs of law enforcement by permitting the interception of encrypted communications in circumstances where unencrypted communications have previously been intercepted (as where a court order has been obtained).

In addition to serving the needs of law enforcement, key recovery systems find application in purely private contexts. Thus, organizations may be concerned about employees using strong encryption of crucial data where keys are not recoverable. Loss of keys may result in loss of important data.

An important aspect of key recovery systems is the method used to ensure that correct recovery information is provided. If the recovery information provided is not correct, either through unintentional error, or deliberate attempt to conceal, the functionality of the key recovery system can be thwarted. Validation can be provided in several ways, including direct checking by the participants, checking by the trustees, and checking by the recovery entity. Correctness can also be ensured by redundant calculation and disclosure of the recovery information by more than one of the communicating parties.

Verification methods have several desirable properties. The verification method should not require communication with parties external to the given communication, either at installation, or during message creation and transmission. The method of verification should ensure correctness even if some (but not all) of the communicating parties deliberately attempt to provide incorrect recovery information. The verification method should minimize the required computations, and transmission overhead associated with the verification.

Key recovery systems of various types are described in D. E. Denning and D. K. Branstad, "A Taxonomy for Key Escrow Encryption Systems", *Communications of the ACM*, vol. 39, no. 3, Mar. 1996, pp. 34–40, incorporated herein by reference. Several specific key recovery systems are noted below.

Micali et al. U.S. Pat. Nos. 5,276,737 ("Micali I") and 5,315,658 ("Micali II") describe a "fair" public key cryptosystem in which the private key of a public/private key pair is broken into "shares" that are given to "trustees". The "breaking" is done in such a manner that: (1) the shares of all trustees (or a predetermined quorum) are required to reconstruct the key; and (2) each trustee can individually verify the correctness of his share. When all the trustees have certified the correctness of their share, the user's public key (corresponding to the escrowed private key) is certified by a key management center. Upon a predetermined requests the trustees provide their shares to a law enforcement agent or other recovering entity, who then reconstructs the private key from the shares and, with the private key, is able to monitor communications to the user. In this key recovery system, verification is done by the key management center and the trustees. This method of verification is undesirable, in that it requires prior communications with the trustees and key management center.

In another key recovery system, described in U.S. Pat. No. 5,557,346 to Lipner et al., the sender splits a session key into first and second session key portions by setting the first session key portion equal to a random number and setting the second session key portion equal to the XOR product of the random number and the session key. The sender creates a law enforcement access field (LEAF) by encrypting the respective session key portions with the public encryption keys of first and second key recovery agents and concatenating the two encryption products. The sender also creates a LEAF verification string (LVS) by concatenating the original session key portions and encrypts this using the session key to form an encrypted LEAF verification string (ELVS). Finally, the sender transmits an encrypted message, together with the LEAF and ELVS, to the receiver.

Before decrypting the encrypted message, the receiver regenerates the LEAF to verify that the sender has created a proper LEAF that would actually permit recovery of the session key through the key recovery agents. This is done by decrypting the ELVS to obtain the session key portions and then encrypting the respective session key portions with the public encryption keys of first and second key recovery agents. If the receiver succeeds in regenerating the transmitted LEAF in this manner, it concludes that the LEAF is genuine and proceeds to decrypt the message. Otherwise, it concludes that the LEAF is corrupt and does not proceed with the decryption step.

In this key recovery system, the verification of key recovery information is done by the receiver, which does avoid communication with the trustees or key management center. It does however require several public key encryption and decryption operations for every communication session, which is expensive in terms of computation and message size.

The copending application of R. Gennaro et al., Ser. No. 08/725,102, a filed Oct. 2, 1996, and entitled "Two-Phase Cryptographic Key Recovery System" (attorney docket P0996104), describes an alternative method of key recovery called SKR, which permits a portion of the key recovery information to be generated once and then used for multiple encrypted data communications sessions and encrypted file applications. In particular, the mentioned portion of the key recovery information that is generated just once is the portion that requires public key encryption operations. Hence, SKR provides a way of reducing the costly public key encryption operations required of other key recovery methods.

The Gennaro et al. application also describes a verification mode in which the communicating parties Alice and Bob each produce SKR recovery blocks independently, without checking the other's so produced blocks. In this mode, if at least one side is correctly configured, all required recovery information is correctly produced. In addition, both Alice and Bob are free to include any optional recovery fields without causing a false invalidation of what the other sent. One limitation of this verification mode, however, is that it cannot be used in non-interactive communications.

The SKR method of key recovery and verification described in the Gennaro et al. application is computationally efficient, as it provides for extensive caching of the recovery information, and requires no explicit verification. Its principal disadvantages are: (1) that it does not provide verification for non-interactive communications without requiring the receiver to perform public key operations; and (2) that it requires the transmission of additional secret information to Bob to allow him to perform verification, increasing the size of required communications.

The recent paper of E. Verheule B. -J. Koops and H. C. A. van Tilborg entitled "Binding Cryptography, A Fraud-Detectible Alternative to Key-Escrow Proposals" (1996), published at http://cwis.kub.nl/~frw/people/koops/binding.htm, and the paper of E. Verheul and H. C. A. van Tilborg entitled "Binding the ElGamal Encryption Scheme" (1996), published at http://cwis.kub.nl/~frw/people/koops/bindtech.htm, present an alternative for validation of key recovery information. The papers describe a method in which a disinterested observer can verify that something encrypted under a receiver's public key is the same as something encrypted under an agent's public key. If the "something" is a session key or part of a session key, as is the case in key recovery fields, the observer can use this to validate the encrypted recovery data. Unlike the previous methods of verification, however, this method provides no way for the observer to verify that the encrypted fields actually contain correct information; instead, the observer only verifies that the encryptions contain the same secret.

Still other methods of verifiably providing key recovery use variants of the Diffie-Hellman (DH) key agreement protocol. By way of background, the Diffie-Hellman key agreement protocol is a procedure whereby two parties may establish a shared secret value (from which a symmetric encryption key may be derived) by exchanging only public values over a communications channel. The protocol was originally described at page 649 of W. Diffie and M. E. Hellman, "New Directions in Cryptography", *IEEE Transactions on Information Theory*, vol. IT-22, no. 6, Nov. 1976, pp. 644–654, and in U.S. Pat. No. 4,200,770, both incorporated herein by reference.

In the two-party interactive form of the protocol, each party generates (e.g., pseudorandomly) a secret value x which it keeps to itself. Each party then generates a public value $$y = g^x \bmod p$$

where x is the secret value of that party, p is a prime modulus and g is a generator over the Galois field GF(p) consisting of the set of integers {0, 1, 2, ... p−1}, and transmits the public value to the other party. Thereafter, each party generates a shared secret value $$z = y^x \bmod p$$

where x is its own secret value, y is the public value received from the other party, and p is defined as above. By virtue of the properties of modulo arithmetic, the shared secret values z generated by the two parties are the same.

The parties may derive a symmetric encryption key directly from the shared secret value z, as by extracting the required number of bits. Alternatively, the parties may perform a further operation on the shared secret value such as concatenating it with another value and hashing the concatenation result, as described in the copending application of S. M. Matyas et al., Ser. No. 08/736,774, filed Oct. 25, 1996, entitled "Method and Apparatus for Establishing an Authenticated Shared Secret Value Between a Pair of Users", incorporated herein by reference.

The security of this procedure relies on the apparent fact that, for appropriate choices of p and g, it is computationally infeasible to obtain either the secret values x or the shared value z from the public values y exchanged between the parties. Although exponentiation over a finite field was used in the above example, in general any suitable functions y(x) and z(x, y) may be used that have the commutative property $z(x1, y(x2)) = z(x2, y(x1))$ for any x1 and x2 and have the noninvertibility property mentioned above.

One such method of verifiably providing key recovery based on establishing a shared common Diffie-Hellman key was proposed by Dorothy E. Denning in "To Tap or Not to Tap", *Communications of the ACM*, vol. 36, no. 3, Mar. 1993, pp. 26–33. In this paper she proposed an escrow system based on a three-party variation of Diffie-Hellman described in section 22.1 of B. Schneier, *Applied Cryptography* (2d ed. 1996) as well as in the original Diffie et al. (1976) article cited above. In this method of key recovery, the verification of the recovery information can be inherent in the receiver's decryption of the information encrypted under the shared session key k.

The system proposed by Denning works as follows: Let Alice be the sender, Bob be the receiver, and Ted the trustee in order around the three-party circle. Let their respective secret parts be x, y, and z. In the first round, Alice sends to Bob $g^x$ mod p, Bob sends to Ted $g^y$ mod p, and Ted sends to Alice $g^z$ mod p. In the second round, Alice sends to Bob $g^{zx}$ mod p, Bob sends to Ted $g^{xy}$ mod p, and Ted sends to Alice $g^{yz}$ mod p. From these values, everyone can calculate $k = g^{xyz}$. If Alice sends something to Bob encrypted with k, Bob knows that Ted can calculate k and decrypt it also. (If Alice is dishonest, and does not want Ted to be able to calculate k correctly she could send an incorrect value of $g^{zx}$ mod p to Bob, and Bob would be unable to detect the error. This can be fixed by having Bob verify this value directly with Ted as an additional exchange of messages after the second round.)

This method has the advantage of being able to send encrypted recovery information to both Bob and Ted with a single encrypted field, thus reducing the size of data and the number of calculations. However, this method has the disadvantage of requiring communication with the trustee prior to transmission of the message to the receiver.

In a paper entitled "Alternatives to RSA Using Diffie-Hellman with DSS" (1996), published at http://www.cylink.com/products/security/rsa/rsa-dss2.htm, Cylink Corporation proposed a method similar to Denning's, but not requiring interactive communication with the trustee. Using the same example, let Alice be the senders Bob be the receiver, and Ted be the trustee, and let their respective secret parts be x, y, and z.

Prior to any communication, Ted calculates a shared Diffie-Hellman key v with Alice based on Alice's public key ($g^x$ mod p), and his private key Z, as follows:

$u = g^{zx}$ mod p $v = g^u$ mod p

Ted publishes v as a public key shared between Alice and him. For communication with Bob, Alice can calculate a key k as:

$k = g^{yv}$ mod p

Both Bob and Ted can calculate k, so if Alice sends something to Bob encrypted with k, she knows that Ted can also read it. In addition, Bob can verify this escrow, as he knows that Ted published the shared key v, and Ted can therefore calculate k. However, the disadvantage of this method is that it requires Alice to obtain a published shared key from Ted prior to communication with Bob.

SUMMARY OF THE INVENTION

This invention presents a method of verification of key recovery information within a key recovery system, based on a variation of the three-party Diffie-Hellman key agreement procedure. Without communication with a trustee, the sender is able to encrypt recovery information in such a way that both the receiver and the respective trustee can decrypt it. This reduces the number of encryptions, and inherently validates the recovery information when the receiver decrypts it. The method is compatible with interactive and non-interactive communication, and can preserve perfect forward secrecy. The method allows full caching of all public key operations, thus further reducing computational overhead.

Note that while Diffie-Hellman is used to describe this method, any public key method with commutative common key agreement properties may be used. While RSA does not have this property, versions of elliptic curve encryption do have this property, and can directly use this method for deriving shared keys.

For the simplified description of the design, consider the case in which Alice is sending an encrypted message to Bob, and wants to provide key recovery information that can be read by Ted. (A more detailed designs handling multiple parties and agents will be provided below.) Let Alice, Bob and Ted have the respective DH keypairs {x, $g^x$ mod p}, {y, $g^y$ mod p}, {a, $g^a$ mod p}, where the public components ($g^x$ mod p, $g^y$ mod p, $g^a$ mod p) are known to all parties.

At any time, both Alice and Bob can calculate the following:

$u = g^{xy}$ mod p (their common key)

{u, $g^u$} mod p (a new DH keypair shared between Alice and Bob)

$v = g^{au}$ mod p (a new common key between Alice-Bob and Ted)

Alice then picks a session key K which will be used to encrypt the message, and sends to Bob:

v(K)

$g^u$

K (message)

where the expression v(K), for example, indicates symmetric encryption of X under the key v.

The first part includes the symmetric encryption under v of K. This field can be decrypted by Bob, who can calculate v from Ted's public key $g^a$, and u. Ted can also decrypt the field, based on the included $g^u$ in the messages and his secret a. Thus the field v(K) serves both as secure transmission of K to Bob and as recovery information for Ted.

Note that all expensive public key calculations (the exponentiations) depend only on the secret values x, y, and a (for Alice, Bob, and Ted respectively). These values may be as long lived or as short lived as desired, trading off computation expense for greater security. In the non-interactive case, the values will typically be long lived, with the public components distributed as certificates. In this case there is no perfect forward secrecy, but all exponentiations are constant, and therefore need only be calculated once, and the results saved, providing significant reduction in computational overhead. In the interactive case, if perfect forward secrecy is desired, Alice and Bob can exchange ephemeral DH keys. This provides greater security, at the expense of having to perform all of the exponentiations for each session. In the interactive case, new values may be calculated at any desired frequency.

In all cases, it is assumed that the obtained Diffie-Hellman public keys have been validated (i.e., authenticated as actually originating from the person purporting to be the owner). Long-lived keys will typically be distributed as certificates whose signatures can be validated. In the case of ephemeral Diffie-Hellman keys, it is assumed that the ephemeral key exchange has been signed by certified keys in some way. The exact method of validation of these ephemeral keys is application dependent. One such method is described in the copending application of S. M. Matyas et al., Ser. No. 08/736,774, referred to above.

The present invention incorporates several desirable features. It provides the ability to cache all public key operations, and can be used in the interactive and non-interactive cases. It serves as a vehicle for transmission both to Bob and to the recovery agent, saving encryptions. Since it uses only published public keys, no additional keys need be exchanged. It preserves perfect forward secrecy in the interactive case, where Alice and Bob exchange ephemeral $g^x$ and $g^y$. Finally, it preserves the validation by both Alice and Bob: if Alice is honest, she correctly uses the agent's $g^a$; if Bob is honest, he inherently verifies that v is correctly based on $g^a$.

Unlike Micali's methods the present invention does not require communication with the trustees, and the trustees do not verify the recovery information; verification is done by the receiver.

Unlike Lipner's methods in which the receiver verifies by duplicating the encryption of the recovery information, and comparing this calculation to what was sent by the sender, this method allows the receiver to verify by decrypting the recovery information directly. Rather than sending one encrypted copy for the agent, and another encrypted copy for the receiver (so that the receiver can do the forward encryption under the agent's public key to verify the copy sent to the agent), this method sends a single copy that can be decrypted by both the receiver and the agent, in such a way that the receiver's decryption verifies that the field can also be decrypted by the agent. This saves the separate transmission of the recovery information to the receiver, encryption, thus saving both computations, and communication bandwidth. In addition, this form of public key exchange can allow the expensive public key operations to be cached for even further savings.

Verheul's method is similar to Lipner's, in that there are two transmissions of encrypted recovery information—one to the receiver, and one to the trustee. Unlike Lipner, so however, it binds these two encrypted fields together, so that a separate observer can verify the equivalence of the encrypted information. In this invention, the verification is done strictly by the receiver, and observers are not able to validate the recovery information.

While this invention may appear similar to Denning's use of three-way Diffie-Hellman, it is distinct in that it does not require any communication with the trustee. In fact, this method does not require any interactive communication, making it suitable for both interactive and non-interactive communication While this method may appear similar to Cylink's variation of Denning's method, it is distinct in that it does not require Alice to obtain a published shared key with her agent (Ted), prior to communication with Bob. This is important for scalability, as in the general case, Alice might otherwise be required to obtain registered shared keys with many trustees in many different legal jurisdictions.

In addition, the method is compatible with R. Gennaro et al.'s two-phase recovery method, which together further reduce the computational overhead through caching of the public key phase. Unlike that method's verification by redundant generation, this method can be used in the non-interactive case. While this invention avoids interactive communication with the trustees, and is thus compatible with non-interactive communication, it is also compatible with interactive communication, and it preserves the perfect forward secrecy of the communication in the interactive case.

BRIEF DESCRIPTION OF THE DRAWINGS

FIG. 13 is a flowchart of the procedure followed by a law enforcement agent.

FIG. 14 is a flowchart of the procedure followed by a key recovery agent.

DESCRIPTION OF THE PREFERRED EMBODIMENT

Preferably, the verification system of the present invention is incorporated into the SKR key recovery system described in the above-identified copending application of R. Gennaro et al. The essential features of that key recovery system as they relate to the present invention are described below. Other features of the SKR key recovery system, though not essential to an understanding of the present invention and forming no part of the present invention, may be found in that application, the specification of which is incorporated herein by reference.

General Environment

Figure 1:
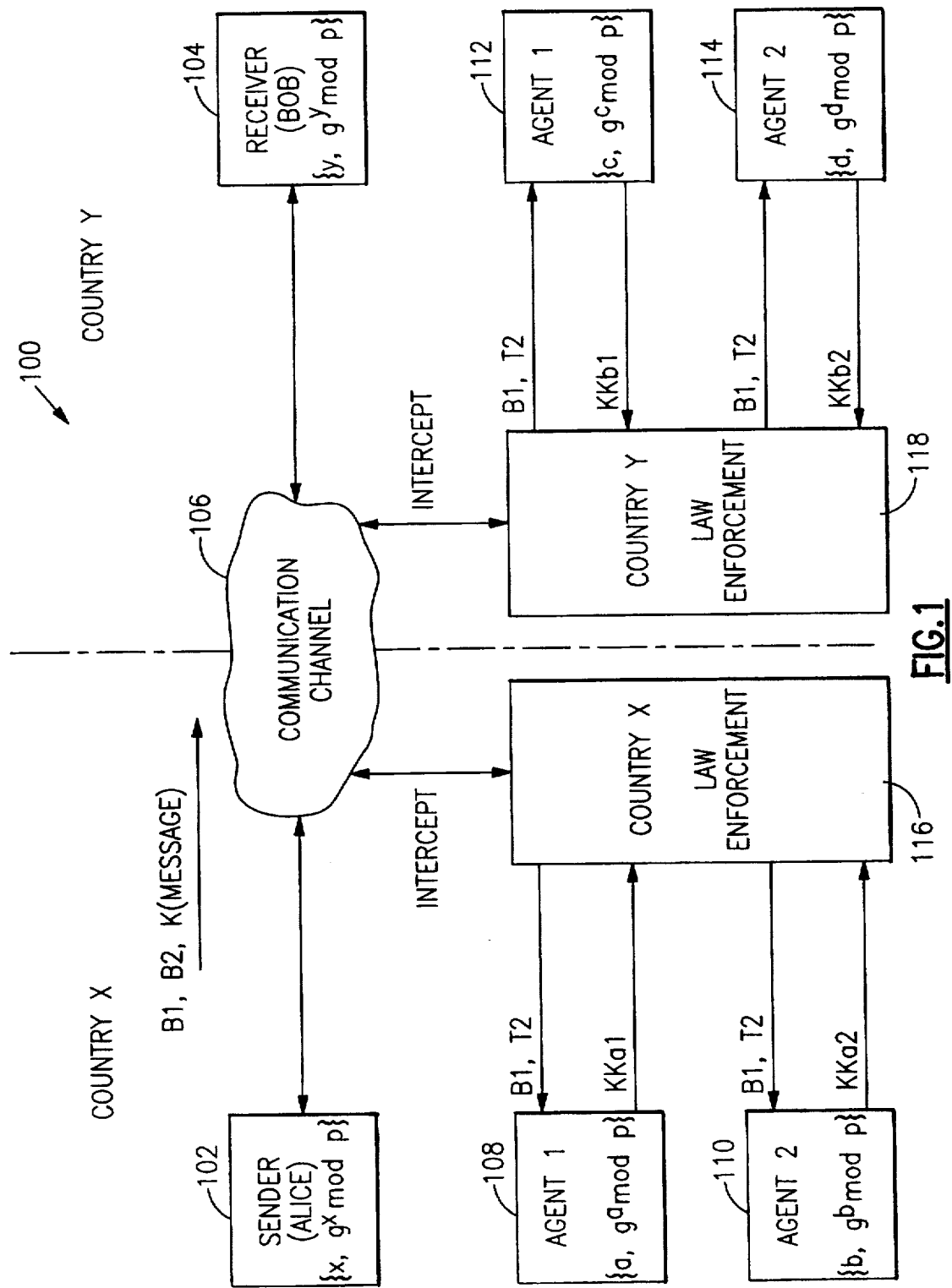
FIG. 1 is a schematic block diagram of a communication system incorporating the present invention.

FIG. 1 shows a communication system 100 in which the present key recovery system may be used. In system 1000 a sender 102 ("Alice") in country X communicates with a receiver 104 ("Bob") in country Y by transmitting encrypted data comprising one or more messages (making up a communications session or electronic mail application) or one or more files (making up a file transfer application) over a communications channel 106. Sender 102 and receiver 104 may each comprise computer workstations, suitably programmed (using program storage devices such as magnetic, optical or semiconductor media containing programs of instructions thereon) to provide the encryption and key recovery functions described below. Although the example of FIG. 1 assumes that the sender 102 and receiver 104 are located in different countries (X and Y), the invention may also be used entirely within a single country.

Continuing with the description of FIG. 1, the transmitted messages are encrypted by the sender 102 using a data encryption key and decrypted by the receiver 104 using a corresponding data decryption key. If a symmetric encryption scheme (e.g., DES) is used, then the data encryption key (which is also the data decryption key) is the "secret" data key for the purposes of key recovery (i.e., the SKR-protected data key). However, the present invention is not limited to the protection of data keys. The SKR system can also be used to provide key recovery services for any secret key. For example, if an asymmetric encryption scheme (e.g., RSA) is used, then the private part of the key is the "secret" SKR-protected key for the purposes of key recovery.

A pair (in this particular example) of key recovery agents, or trustees, 108 and 110 are selected in country X, while a pair of key recovery agents 112 and 114 are selected in country Y. It is contemplated that the establishment of key recovery agents could take place as part of the establishment of a general public key infrastructure.

Communications over communication channel 106 are assumed to be subject to interception by third parties, including respective law enforcement agents 116 and 118 in countries X and Y. Non-governmental third parties intercepting the encrypted communications will be unable to decipher the communications unless they successfully use one or more cryptanalytic techniques. On the other hand, a law enforcement agent 116 or 118 having proper authority will be able to recover an SKR-protected key, using the key recovery agents 108, 110 or 112, 114 for his country as described below, and the sender (Alice) or receiver (Bob) will also be able to recovery an SKR-protected key using a similar procedure.

Two-Phase Procedure

The SKR key recovery system as described in the Gennaro et al. application has two phases: a first phase, in which public key encryption is used for calculation of long-term trustee fields, and a second phase, which for each session-calculates session-specific recovery information using only symmetric encryption. The present invention relates primarily to the public key encryptions in phase 1 and their validation.

Prior System

Figure 4A:
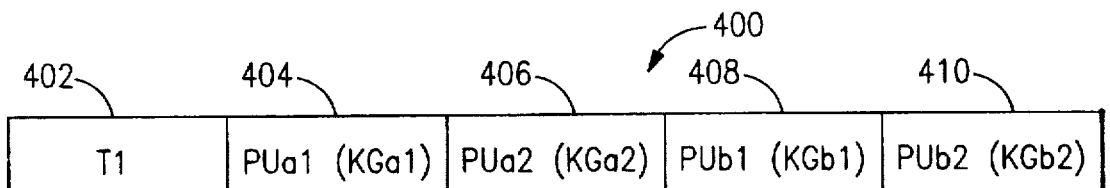
FIG. 4A is a schematic block diagram of the phase 1 data block transmitted from the sender to the receiver in a previous key recovery system.

Phase 1 of the SKR system as described in the Gennaro et al. application is not specific to any particular session key K; the results can be (and are preferably) used for multiple session keys. During this phase, the communicating parties 102, 104 (Alice and Bob) establish a common random seed (S), from which key-generating keys KGa1 (for agent 108), KGa2 (for agent 110), KGa2 (for agent 112)D KGb2 (for agent 114) are derived. Recovery values KGa1–KGb2 constitute long-lived recovery values that are not specific to a particular session key K. These KG values are made available to the agents 108–114 by encrypting them with respective public keys PUa1–PUb2 of the agents, as described in the Gennaro et al. applications to generate encrypted values PUa1(KGa1), PUa2(KGa2), PUb1(KGb1), PUb2(KGb2). As shown in FIG. 4A, these encrypted values are included along with a public header T1 as recovery fields 402–410 in a phase 1 data block (B1) 400 prepared by Alice and sent to Bob.

Figure 2:
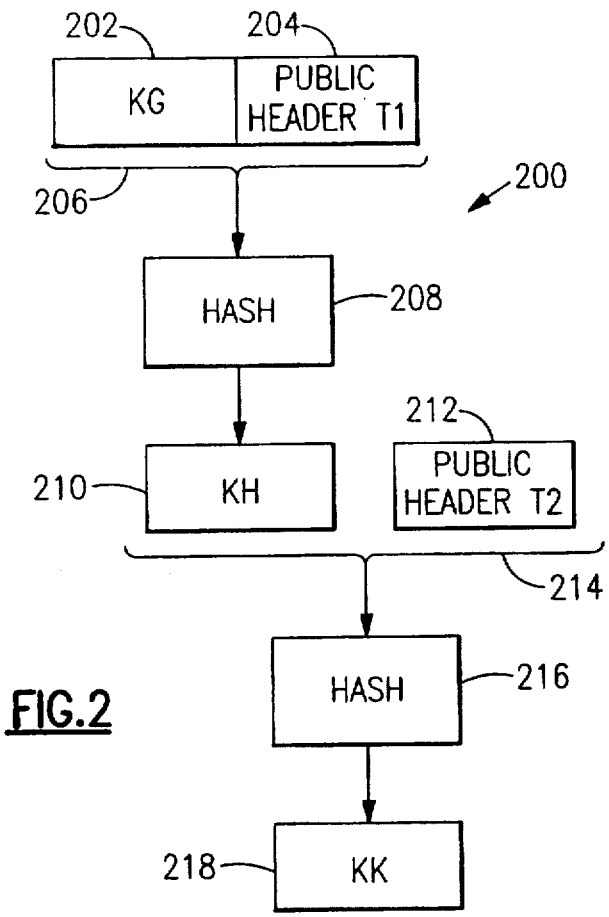
FIG. 2 shows the derivation of a key-encrypting key from a key-generating value.

Referring to FIG. 2, Alice concatenates each KG value (202) with the public header T1 (204) to generate a concatenation result (206), which is passed through a first hash function (208) to generate a second non-key-specific value KH (210). These KH values are used in phase 2 of the procedure, which is performed for a specific session key K, to generate a set of key-encrypting keys KK. Unlike recovery values KGa1–KGb2, key-encrypting keys KKa1–KKb2 are key-specific recovery values that are generated for a particular session key K (although they are not dependent on the session key K). To generate this latter set of keys, Alice concatenates each KH value (210) with a phase 2 public header T2 (212) constituting key-specific recovery information to generate a concatenation result (214), which is passed through a second hash function (216) to generate a key-encrypting key KK (218).

Figure 3:
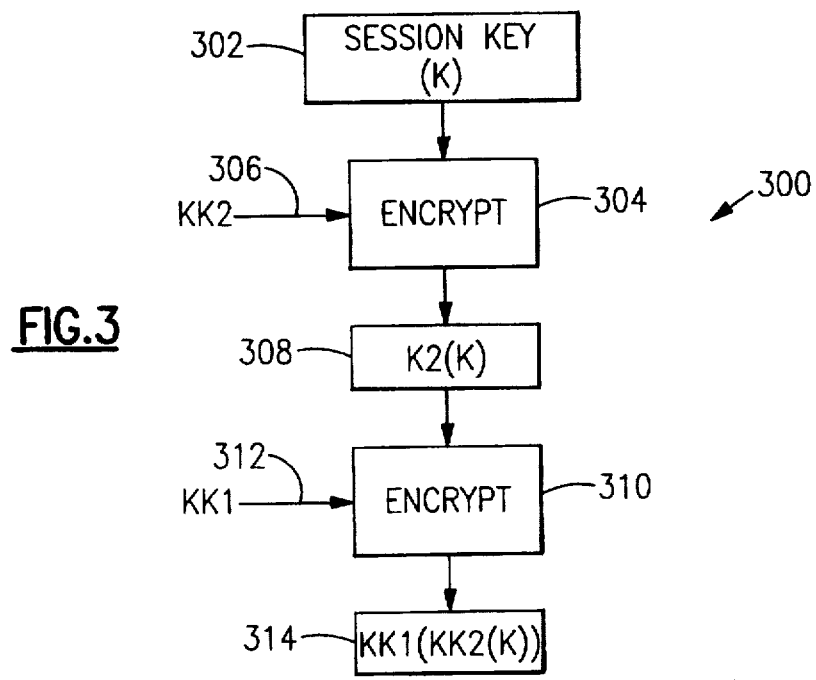
FIG. 3 shows the encryption of a session key using two key-encrypting keys.

Referring to FIG. 3, Alice uses key-encrypting keys KK (218) to "seal" the session K by multiply encrypting it. Thus, for each set of recovery agents 108, 110 and 112, 114, the session key K (302) is first encrypted (304) using the key-generating key KKa2 or KKb2 (306) generated for the second agent 110 or 114 to generate a singly encrypted key KKa2(K) or KKb2(K) (308). The singly encrypted key KKa2(K) or KKb2(K) is then encrypted (310) using the key-generating key KKa1 or KKa2 (312) generated for the first agent 108 or 112 to generate additional, key-dependent recovery information in the form of a doubly encrypted key KKa1(KKa2(K)) or KKb1(KKb2(K)) (314).

Encryption operations 304 and 310 may be performed using the "keyed shuffler" function described in the copending Gennaro et al. application. In this procedure, the input block is partitioned into left and right halves that are subjected to a plurality of masking iterations in which one input half is hashed using a key-dependent hash function and the result XORed with the other input half. However, other symmetric encryption procedures may be used, and the particular encryption procedure used forms no part of the present invention. The order in which the key-encrypting keys are used is immaterial, so long as it is agreed upon; thus, the session key could be encrypted first with the key KKa1, then with the key KKa2 (and similarly KKb1 then KKb2), rather than vice versa as described above.

Figure 5:
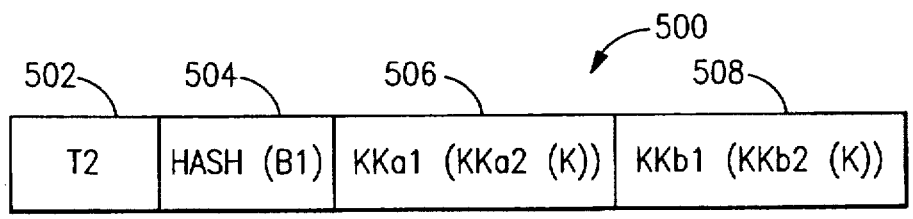
FIG. 5 is a schematic block diagram of the phase 2 data block transmitted from the sender to the receiver.

Referring to FIG. 5, the doubly encrypted values KKa1 (KKa2(K)) and KKb1(KKb2(K)) are included, along with public header T2 and a hash Hash(B1) of block B1, as recovery fields 502—502 in a phase 2 data block (B2) 500 prepared by Alice and sent to Bob.

Optionally, as disclosed in the copending Gennaro et al. application, the rightmost R bits of a particular doubly encrypted K may be suppressed from the recovery field 506 or 508 to create a work factor for the law enforcement agent 116 or 118. If this is done, Alice can construct an additional encrypted field containing the needed R bits as:

M(needed R bits)

where M=Hash(T1 || u), and include the field in an extended block B2. Bob can then obtain the needed R bits directly (without having to use brute-force techniques) by regenerating M from T1 and u and decrypting the additional encrypted field.

After sending data blocks B1 and B2, Alice would send an encrypted message K(message) encrypted with the session key K.

A law enforcement agent (e.g., agent 116) seeking to recover the session key K would intercept the phase 1 and phase 2 data blocks B1 and B2, together with the encrypted message K(message), and turn over B1 and T2 (in B2) to each of his set of key recovery agents (e.g., agents 108, 110), together with suitable evidence of his authority such as a judicial search warrant. Each key recovery agent 108, 110 would then use his own corresponding private key to decrypt the encrypted value PUa1(KGa1) or PUa2(KGa2) to recover the original value KGa1 or KGa2. He would then generate the corresponding key-encrypting key KKa1 or KKa2 from the value KGa1 or KGa2 and the headers T1–T2, using the key derivation procedure 200 shown in FIG. 20 Finally, the key recovery agent 108 or 110 would hand over the thus generated key-encrypting key KKa1 or KKa2 to the law enforcement agent 116. The law enforcement agent 116 would then use the values KKa1 and KKa2 to decrypt the session key K, using the procedure 300 shown in FIG. 3, whereupon he would be able to decrypt the encrypted message K(message) using the recovered session key.

Because of the use of hash functions 208 and 216 in the key derivation procedure 200, the key derivation procedure 200 is one-way in the sense that it is computationally infeasible to invert the procedure to regenerate the KG value 202 from which a particular KK value 218 was generated. Accordingly, even though a law enforcement agent 116 or 118 has the KK values from one recovery operation, he will be unable to recover session keys encrypted using other KK values, even though they were generated from the same KG values (but with different public headers T2). Accordingly, the public key and other operations performed during phase 1 are valid over multiple phase 2 operations (for different session keys) without compromising the security of the encryption procedure.

Present Invention

In the system described above, Bob cannot validate the recovery information in fields 404–410 of block B1 (FIG. 4A) without repeating the computationally expensive public key encryption steps performed by Alice. Also, in order for Bob to validate the recovery information KGa1–KGb2, he must be able to recreate it; this in turn requires either (1) that Alice and Bob agree to the random seed S in advance or (2) that Alice transmit the seed S to Bob in an additional encrypted field in B1, increasing the size of the required communications. The present invention eliminates the need to send additional secret information (S) in encrypted form, since it enables Bob to recover the KG values directly by decryption rather than having to reconstruct them from such secret information.

In general, the present invention changes phase 1 in two ways. First, the secret value S is not exchanged; Alice simply picks random KG values for each key recovery agent. Second, these values of KG are encrypted using a shared DH key as described in this specification. Given these changes, Bob learns the values of KG not by deriving them from S, but by decrypting them from the data block B1. This decryption can also serve to verify for Bob that the encrypted KG values can correctly be decrypted by the respective agents.

In more detail, the modified SKR phase 1 assuming two agents for Alice and two agents for Bob would be:

Let Alice have the DH keypair $\{x, g^x \bmod p\}$
Bob have the DH keypair $\{y, g^y \bmod p\}$
Alice's Agent1 have the DH keypair $\{a, g^a \bmod p\}$
Alice's Agent2 have the DH keypair $\{b, g^b \bmod p\}$
Bob's Agent1 have the DH keypair $\{c, g^c \bmod p\}$
Bob's Agent2 have the DH keypair $\{d, g^d \bmod p\}$
where the components x, y, a–d are secret values and the components ($g^x \bmod p$, etc.) are public values known to all parties.

Figure 6:
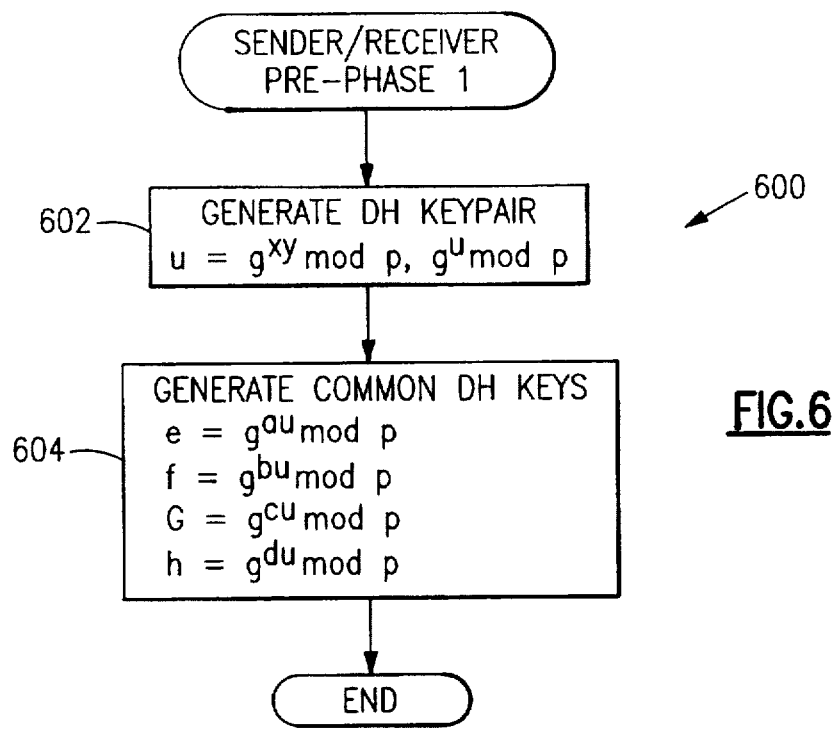
FIG. 6 is a flowchart of the initial key generation procedure followed by both the sender and the receiver.

FIG. 6 shows the initial key generation procedure 600 performed by Alice and Bob, either as a preliminary to the phase 1 procedure (FIGS. 7–8) or as a step of the phase 1 procedure if it has not been performed previously. Referring to FIG. 6, both Alice and Bob calculate the following first pair of shared secret and public values shared by Alice and Bob (step 602):

$u = g^{xy} \bmod p$ (their common key)
$\{u, g^u \bmod p\}$ (a new DH keypair shared between Alice and Bob)

as well as the following additional shared secret values shared by Alice, Bob and a particular agent (step 604):

$e = g^{au} \bmod p$ (a new common key between Alice-Bob and her Agent1)
$f = g^{bu} \bmod p$ (a new common key between Alice-Bob and her Agent2)
$G = g^{cu} \bmod p$ (a new common key between Alice-Bob and his Agent1)
$h = g^{du} \bmod p$ (a new common key between Alice-Bob and his Agent2)

(Note the use of the uppercase G to avoid conflict with the symbol g for the generator.)

Figure 4B:
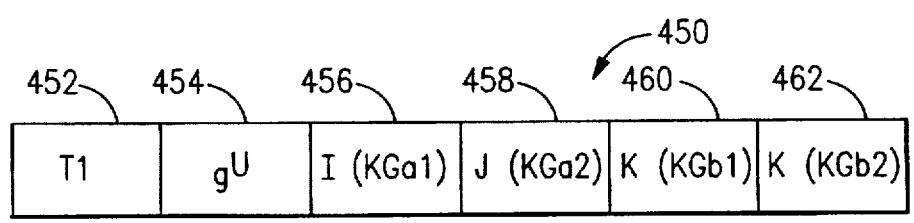
FIG. 4B is a schematic block diagram of the phase 1 data block transmitted in accordance with the present invention.
Figure 7:
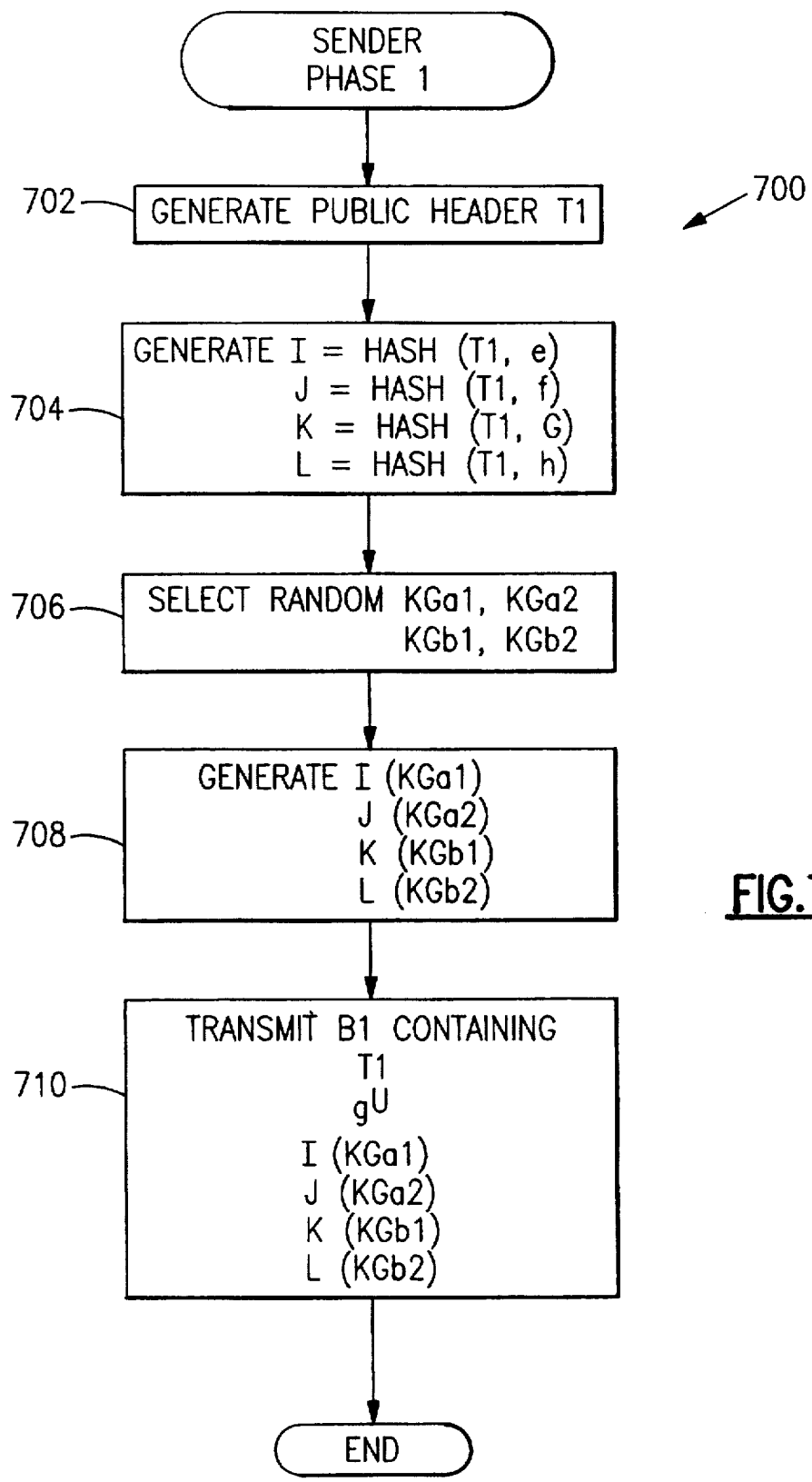
FIG. 7 is a flowchart of the phase 1 procedure followed by the sender.

FIG. 7 shows the phase 1 procedure 700 followed by Alice for a given phase 1 block B1 (FIG. 4). Referring to FIG. 7, Alice calculates a public header (step 702):

T1 (a public header including IDs of Alice, Bobs all key recovery agents, and a timestamp.)

as well as the following keys for encrypting the key-generating keys KGa1–KGb2:

$I = \text{Hash}(T1 \| e)$
$J = \text{Hash}(T1 \| f)$
$k = \text{Hash}(T1 \| G)$
$L = \text{Hash}(T1 \| h)$ where $\|$ indicates concatenation (Note the use of lowercase k to avoid conflict with the symbol K for the session key.) This additional hashing operation enhances the security of the system, since even if an attacker ascertains, say, I for a particular T1, he will be unable to reverse the hash transformation so as to obtain either e or I for another T1. Any suitable hash function may be used for these and other hashing operations described herein, so long as it is infeasible either to invert (ice., find an input producing a given output) or to find another input producing the same output as a given input. One such suitable hash function is the Secure Hash Algorithm (SHA-1), described in FIPS PUB 180-1 *Secure Hash Standard*, April 1995.

Alice then picks random KGa1, KGa2, KGb1, KGb2 (step 706), encrypts them with keys I, J, k, L, using any suitable symmetric encryption procedure such as the DES procedure mentioned above (step 708). If desired, Alice may concatenate each of the KG values with a random salt before encrypting it, for example:

$$I(KGa1 \| \text{Salt})$$

This enhances the resistance of the system to certain types of attacks. Unlike the procedure described in the Gennaro et al. application (where Bob must be able to replicate the encryption procedure, which uses the public key of an agent), Alice may use truly random salts for this purpose without having to communicate any secret values to Bob.

After encrypting the values KGa1–KGb2, Alice sends to Bob a phase 1 block B1 (450) (FIG. 4B) containing (step 710):

T1 (452) (the phase 1 public header)
g" (454) (the shared DH public key)
I(Ga1) (456) (symmetric encryption of KGa1 with key I)
J(KGa2) (458) (symmetric encryption of KGa2 with key J)
k(KGb1) (460) (symmetric encryption of KGb1 with key k)
L(KGb2) (462) (symmetric encryption of KGb2 with key L)

Figure 8:
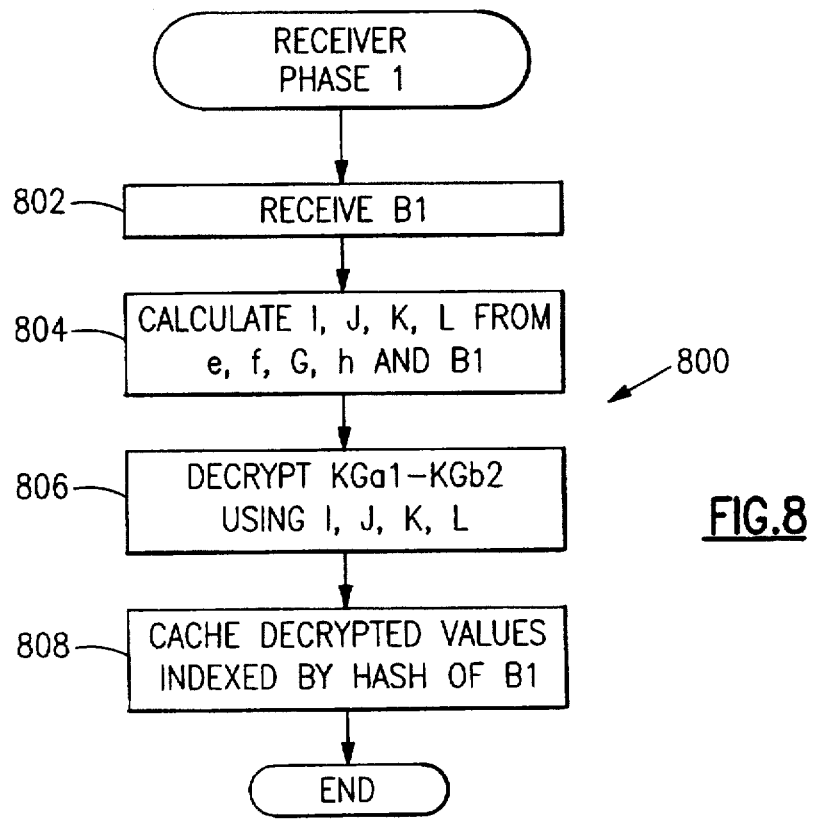
FIG. 8 is a flowchart of the phase 1 procedure followed by the receiver.

FIG. 8 shows the phase 1 procedure 800 followed by Bob. Referring to FIG. 8, upon receiving the phase 1 block B1 (step 802). Bob calculates the I, J, k, L values from e, f, G, h and B1, following the procedure of step 704 (step 804).

Thereafter, Bob decrypts the values KGa1, KGa2, KGb1, KGb2 using the values I, J, k, L, checking that the KG values decrypt properly (step 806). For this purpose it is assumed that the symmetric encryption includes (in addition to any random salt) a message authentication code (MAC), since the values KGa1–KGb2 are arbitrary and would provide no indication of whether they had been recovered correctly. Any suitable means may be used to generate such a MAC, such as concatenating the KG value being encrypted with a hash of itself and encrypting the concatenation result, as for example:

I(KGa1 || Hash(KGa1))

The hash value form a check on the decryption. If Bob uses the wrong value of I, or if the encrypted value is corrupted in transmission, it is exceedingly unlikely that the hash of the decrypted KG would match the MAC.

Bob then caches the decrypted values KGa1, KGa2, KGb1, KGb2, indexed by the hash Hash(B1) of the full block B1 (step 808).

Phase 2 Procedure

Figure 9:
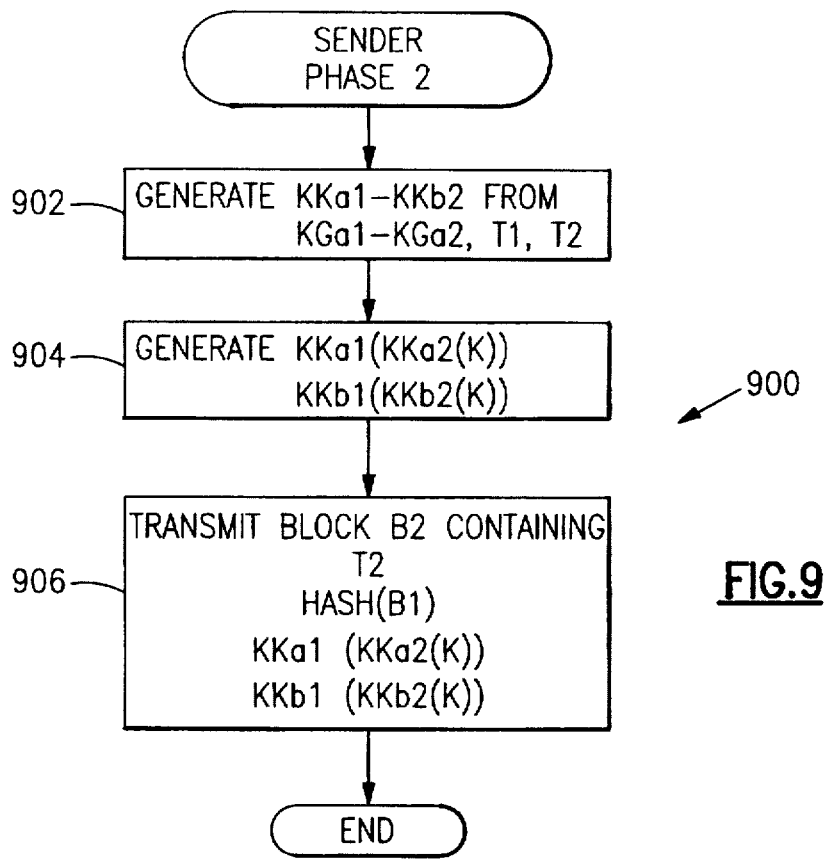
FIG. 9 is a flowchart of the phase 2 procedure followed by the sender.

FIG. 9 shows the phase 2 procedure 900 followed by Alice, which is unchanged from the procedure described in the copending application of R. Gennaro et al. Referring to FIG. 9, in phase 2 Alice first generates key-encrypting keys KKa1–KKb2 from the corresponding key-generating keys KGa2-KGb2 and public headers T1–T2, using the key derivation procedure 200 shown in FIG. 2 (step 902). For each set of key recovery agents 108, 110 and 112, 114 (FIG. 1), Alice then doubly encrypts the session key K with the key-encrypting keys generated for that set of agents, using the encryption procedure 300 shown in FIG. 3, to generate the following doubly encrypted values (step 904):

KKa1(KKa2(K))
KKb1(KKb2(K))

(Here we are assuming for simplicity that no R bits are removed.)

Finally, Alice transmits to Bob a phase 2 block B2 (500) (FIG. 5) containing (step 906):

T2 (502)
Hash(B1) (504)
KKa1(KKa2(K)) (506)
KKb1(KKb2(K)) (508)

As indicated above and as shown in FIG. 5, phase 2 block B2 contains a hash Hash(B1) of the related block B1, which Bob uses to look up the corresponding KG values that he had cached at step 808. From the KG values he can verify the sealed session key fields.

Figure 10:
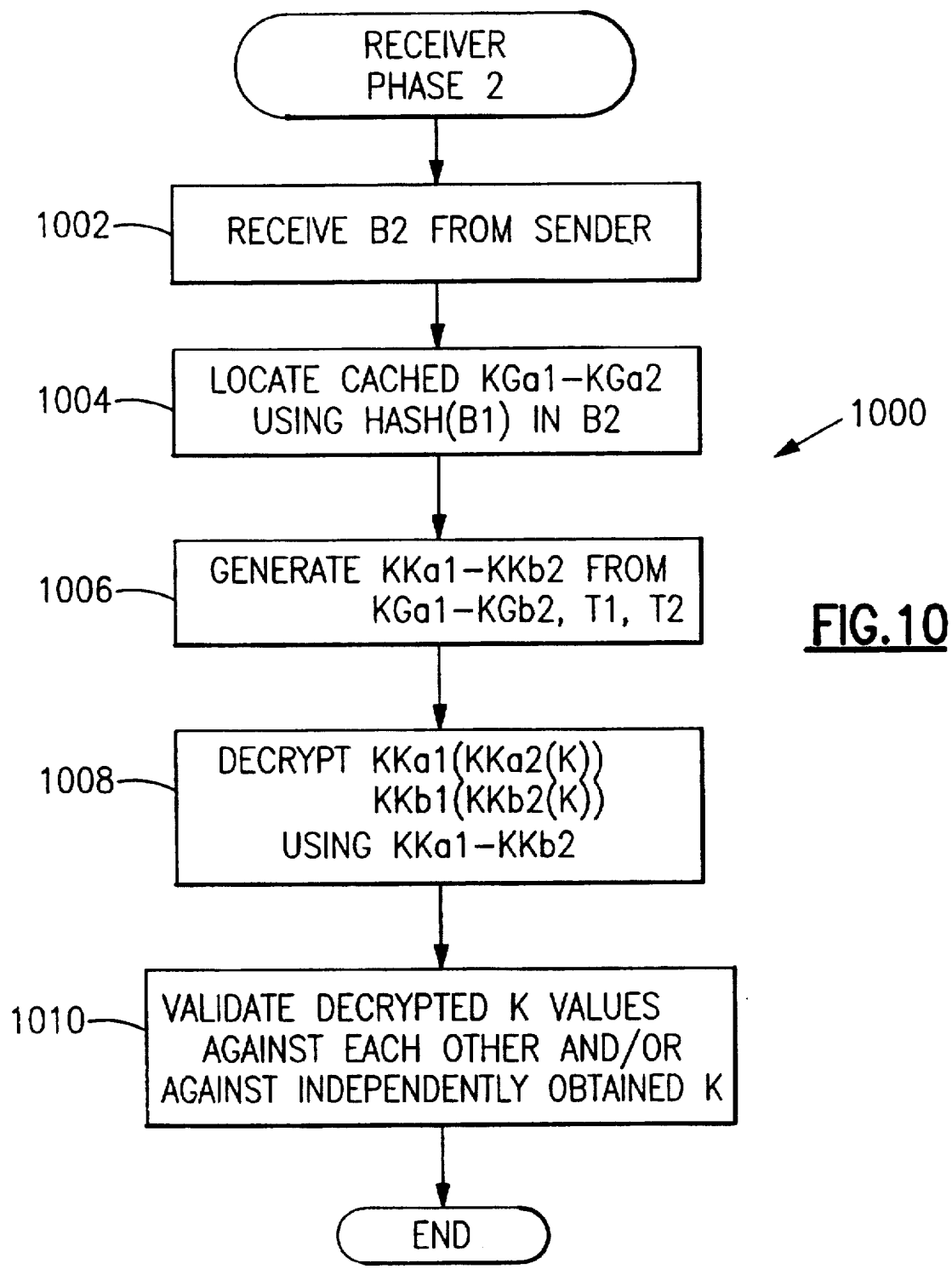
FIG. 10 is a flowchart of the phase 2 procedure followed by the receiver.

FIG. 10 shows the phase 2 procedure 1000 followed by Bob, which is similarly unchanged from the procedure described in the copending application of R. Gennaro et al. Referring to FIG. 10, after receiving the phase 2 block B2 from Alice (step 1002), Bob locates the previously cached values KGa1–KGb2, using the hash value Hash(B1) in the block B2 as an index (step 1004). Bob then generates key-encrypting keys KKa1–KKb2 from the corresponding key-generating keys KGa2–KGb2 and public headers T1–T2, using same procedure 200 (FIG. 2) Alice used at step 902 (step 1006). Next, Bob decrypts the B2 recovery fields KKa1(KKa2(K))
KKb1(KKb2(K))

using the keys KKa1–KKa2 obtained in the preceding step (step 1008).

Thereafter, Bob performs a validation step (step 1010), the nature of which depends on the number of copies of the session key K involved. If there is only a single set of key recovery agents (e.g., agents 108, 110 of country X) and Bob has no independent copy of the session key K other than the one obtained by decrypting a recovery field in step 1008, than no validation is necessary, since Bob is necessarily using the same values as the law enforcement agent 112 and key recovery agents 108, 110 would use to recover the key. On the other hand, if Bob has an independent copy of the session key K (i.e., obtained outside the procedure of the present invention), or if there are multiple sets of key recovery agents as in the present example, then Bob must ensure that all of the various versions of K agree if he is to fully validate the recovery information; if they do not agree, then at least one set of key recovery agents has invalid recovery information.

Validation of a particular recovery field containing a KK1(KK2(K)) (where KKi signifies KKai or KKbi) may be done in any one of several ways. Most straightforwardly, one may doubly decrypt the recovery field using KK1 and KK2 and see if the resulting K agrees with the one independently obtained. Alternatively, one may doubly encrypt an independently obtained K using KK1 and KK2 and see if the result agrees with the recovery field. As a further alternative, one may singly decrypt the recovery field using KK1 and singly encrypt the independent K using K2 and see if the two operations produce the same value KK2(K).

Message Transmission

Figures 11, 12:
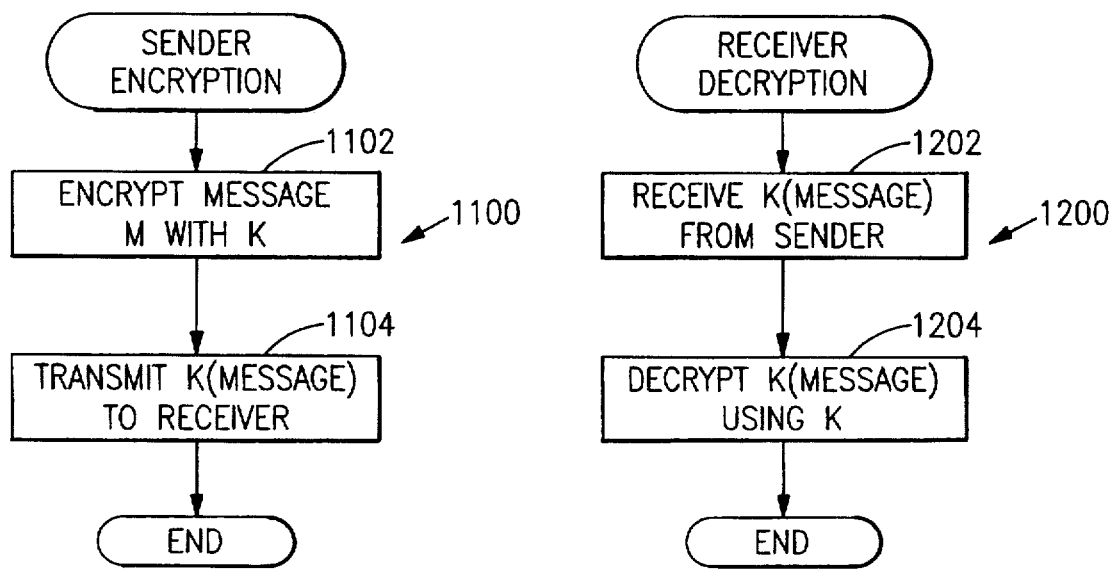
FIG. 11 is a flowchart of the encryption procedure followed by the sender.
FIG. 12 is a flowchart of the decryption procedure followed by the receiver.

Referring to FIG. 11, after Alice has completed the phase 2 procedure 900, she executes an encryption procedure 1100 in which she encrypts one or more messages under the session key K (step 1102) and transmits the encrypted message K(message) to Bob via communications channel 106 (step 1104). Referring to FIG. 12, Bob performs a corresponding decryption procedure 1200 in which, upon receiving the encrypted message K(message) (step 1202), he decrypts it using the session key K (step 1204). As disclosed in the copending Gennaro et al. application, the decryption procedure 1200 may be keyed to the receiver verification steps so that the message is not decrypted unless all or a specified subset of the key recovery fields in data block B1 and B2 have been verified.

Recapitulating the foregoing, the preliminary procedure 600 (FIG. 6) is performed once for each set of DH secret values x, y, a–d and corresponding public values; the phase 1 procedures 700, 800 (FIGS. 7–8) are performed once for each set of values KGa1–KGb1, the phase 2 procedures 900, 1000 (FIGS. 9–10) are performed once for each session key K; and the encryption and decryption procedures 1100, 1200 (FIGS. 11–12) are performed once for each encrypted message K(message) sent from Alice to Bob. Data blocks B1 and B2 are sent at least often enough to ensure their interception by law enforcement agents 116 and 118, since these blocks are essential for key recovery. They may be sent more often, if desired, and could even accompany each encrypted message.

Recovery Procedure

Law Enforcement

FIG. 13 shows the procedure 1300 followed by law enforcement agent 116 in country X for recovering a session key K using key recovery agents 108, 110. Law enforcement agent 118 in country Y would follow a similar procedure except that he would use agents 112, 114 and values KGb1–KGb2 specific to country Y. Although a law enforcement scenario is shown, the present invention may also be used in a private key recovery scenario.

Referring to FIG. 13, law enforcement agent 116 first obtains the data blocks B1–B2 and the encrypted message K(message) by any suitable means, such as by monitoring Alice's transmissions over communications channel 106 (step 1302). The law enforcement agent 116 then presents the data block B1 and public header T2, along with appropriate evidence of authority such as a judicial search warrant, to the key recovery agents 108, 110 (step 1304). Preferably, the agents do not get the doubly encrypted recovery field KKa1(KKa2(K)), as thus would allow them to reconstruct the session key K, which is generally not desired.

If they are satisfied with the authority of the law enforcement agent 116, the key recovery agents 108, 100 regenerate respective key-encrypting keys KKa1–KKa2, using the procedure 1400 shown in FIG. 14, and return these values to the law enforcement agent. Upon receiving these values from the key recovery agents 108, 110 (step 1306), the law enforcement agent 116 decrypts the recovery field KKa1 (KKa2(K)) using KKa1 and KKa2 to recover the session key (step 1308), and decrypts the encrypted message K(message) using the recovered session key K (step 1310).

Key Recovery Agents

FIG. 14 shows the procedure 1400 followed by key recovery agent 108. The other agents 110, 112, 114 would use the same procedure, with obvious changes in variable names and the like.

Referring to FIG. 14, upon receiving B1, T2 and a warrant from law enforcement agent 116 (step 1402), key recovery agent 108 inspects the warrant to determine whether the requested recovery is authorized. If it is, then key recovery agent 108 generates the shared secret value $$e = g^{au} \bmod p$$

using the public value $g^u$ from B1 and its own secret value a, and hashes this value to generate the value $$I = \text{Hash}(T1 \| e)$$

where T1 is obtained from B1 (step 1404). Key recovery agent 108 then decrypts I(KGa1) using I (step 1406), and generates the key-encrypting key KKa1 from KGa1 using the key derivation procedure 200 used by Alice in step 904 and by Bob in step 1006 (step 1408). Finally, key recovery agent 108 hands over the key-encrypting key KKa1 to the law enforcement agent 116 (step 1410), who uses it as described above to recover the session key K.

Conclusion

The present invention allows the option within the SKR key recovery system of having the key recovery system transmit the session key K within the data blocks B1 (450) and B2 (500). As this method inherently effects the transmission of the KG values to Bob, if the session key K is also transmitted within the key recovery system, there is no need for an external key exchange mechanism. The transmission of K within SKR can be accomplished with the sealed key recovery fields KKa1(KKa2(K)) and KKb1(KKb2(K)) in B2. When Bob decrypts them, the value he decrypts would be used as K. Verification of these recovery fields is then inherent in Bob's decryption of them, as that is how he obtains the session key K.

Various modifications of the system described above will be apparent to those skilled in the art.

In the system described above, there were two trustees per key recovery jurisdiction. However, more than two trustees may be used in each jurisdiction, or only a single trustee if desired.

In the system described above, the key recovery values KGa1–KGb2 encrypted under the symmetric encryption keys I–L were long-lived (i.e., non-key-specific) values that were generated independently of the session key K and used to generate key-encrypting keys KKa1–KKb2. Alternatively, the encrypted key recovery values may consist of the session key K itself or may comprise n shares of the session key generated, for examples by designating n−1 random numbers as the first n−1 shares and generating the nth share as the XOR product of the first n−1 shares and the key K. In such an embodiment, there would be no encryption of the session key K, since the shares themselves would be sufficient to regenerate the key.

Still other modifications will be apparent to those skilled in the art.

What is claimed is:

1. In a system in which a sender encrypts data under an encryption key to generate encrypted data and transmits said encrypted data along with recovery information to a receiver via a communications channel, said system having a trustee for enabling the recovery of said encryption key using said recovery information, said sender and said receiver having a first shared secret value that is not shared with said trustee, said trustee holding a secret value from which a corresponding public value is generated, a method for making said recovery information available to said trustee, wherein said sender performs the steps of:

generating a first shared public value from said first shared secret value;

generating an additional shared secret value from said first shared secret value and the public value generated from the secret value held by said trustee, encrypting said recovery information using said additional shared secret value generated for said trustee; and transmitting said encrypted recovery information to said receiver via said communications channel, said trustee being able to decrypt said recovery information by regenerating said additional shared secret value from said first shared public value and the secret value held by said trustee.

2. The method of claim 1 in which said encryption key is a session key.

3. The method of claim 1 in which said sender and said receiver hold respective secret values from which corresponding public values are generated, said first shared secret value being generated from said secret value held by said sender and the public value generated from the secret value held by said receiver.

4. The method of claim 3 in which said first shared secret value is generated as:

$$u = g^{xy} \bmod p,$$

where x is the secret value held by said sender, y is the secret value held by said receiver, p is a prime modulus, and g is a generator.

5. The method of claim 1 in which said sender performs the further step of:

transmitting said encrypted data to said receiver via said communications channel.

6. The method of claim 1 in which said sender performs the further step of:

transmitting said first shared public value to said receiver via said communications channel.

7. The method of claim 1 in which said first shared public value is generated as $g^u \bmod p$, where u is said first shared secret value, p is a prime modulus, and g is a generator.

8. The method of claim 7 in which said additional shared secret value is generated as $$v = g^{au} \bmod p,$$

where a is the secret value held by said trustee, u is said first shared secret value, p is said prime modulus, and g is said generator.

9. The method of claim 1 in which said recovery information comprises said encryption key.

10. The method of claim 1 in which said system has a plurality of trustees, each of which is provided with recovery information and holds a secret value from which a corresponding public value is generated, said steps of generating an additional shared secret value and encrypting said recovery information being performed for each of said trustees.

11. The method of claim 10 in which said encryption key is split into shares that may be combined to regenerate said encryption key, each of said trustees being provided one of said shares as recovery information.

12. The method of claim 1 in which said system has one or more trustees for each of a plurality of key recovery jurisdictions.

13. The method of claim 1 in which said recovery information is generated independently of said encryption key, said sender performing the further steps of:

generating additional recovery information as a function of said encryption key; and transmitting said additional recovery information to said receiver via said communications channel.

14. The method of claim 1 in which said sender performs the further steps of:

encrypting said encryption key using a key-encrypting key generated from said recovery information; and transmitting said encrypted encryption key to said receiver via said communications channel.

15. The method of claim 14 in which said encryption key is one of a plurality of encryption keys, each of which has a corresponding key-encrypting key that is generated as a function of said recovery information and information that is specific to the encryption key.

16. The method of claim 14 in which said system has a plurality of trustees, each of which is provided with recovery information from which a different key-encrypting key is generated, said encryption key being multiply encrypted with said key-encrypting keys.

17. The method of claim 1 in which said receiver performs the steps of:

receiving said encrypted recovery information;

generating said additional shared secret value from said first shared secret value and said public value generated from said secret value held by said trustee; and decrypting said encrypted recovery information using a said additional shared secret value.

18. The method of claim 17 in which said sender performs the further step of transmitting said encrypted data to said receiver via said communications channel, said receiver performing the further steps of:

receiving said encrypted data; and decrypting said encrypted data using said encryption key.

19. The method of claim 18 in which said receiver obtains said encryption key using said recovery information.

20. The method of claim 18 in which said step of decrypting said encrypted data comprises the steps of:

determining whether said encrypted recovery information was correctly decrypted; and decrypting said encrypted data only if it is determined that said recovery information was correctly encrypted.

21. The method of claim 20 in which said encrypted recovery information includes a message authentication code, said step of determining whether said encrypted recovery information was correctly decrypted comprising the step of testing said message authentication code.

22. The method of claim 1 in which said trustee performs the steps of:

receiving said encrypted recovery information;

generating said additional shared secret value from said first shared public value and said secret value held by said trustee; and decrypting said encrypted recovery information using said regenerated additional shared secret value.

23. The method of claim 1 in which said recovery information comprises non-key-specific recovery information usable to recover other keys.

24. The method of claim 23 in which said sender caches said recovery information for use in recovering said other keys.

25. The method of claim 23 in which said sender also generates and transmits to said receiver key-dependent recovery information used in conjunction with said non-key-specific recovery information to recover said encryption key.

26. The method of claim 25 in which said key-dependent recovery information is generated by generating a key-specific recovery value from said non-key-specific recovery information and key-specific recovery information and generating said key-dependent recovery information from said key-specific recovery value and said encryption key.

27. The method of claim 26 in which said key-dependent recovery information is generated by encrypting said encryption key with said key-specific recovery value.

28. A program storage device readable by a machines tangibly embodying a program of instructions executable by the machine to perform the method steps of claim 1.

29. In a system in which a sender encrypts data under an encryption key to generate encrypted data and transmits said encrypted data along with recovery information to a receiver via a communications channels said system having a trustee for enabling the recovery of said encryption key using said recovery information, said sender and said receiver having a first shared secret value that is not shared with said a trustee and a first shared public value generated from said first shared secret value, said trustee holding a secret value from which a corresponding public value is generated, said transmitted recovery information being encrypted using an additional shared secret value generated from said first shared secret value and the public value generated from the secret value held by said trustee, a method for regenerating said recovery information for said receiver, wherein said receiver performs the steps of:
- receiving said encrypted recovery information;
- generating said additional shared secret value from said first shared secret value and said public value generated from said secret value held by said trustee; and
- decrypting said encrypted recovery information using said additional shared secret value.

30. The method of claim 29 in which said receiver performs the further steps of:
- receiving said encrypted data; and
- decrypting said encrypted data using said encryption key.

31. The method of claim 30 in which said receiver regenerates said encryption key using said decrypted recovery information.

32. The method of claim 31 in which said decrypted recovery information comprises non-key-specific recovery information usable to recover other keys.

33. The method of claim 32 in which said receiver caches said decrypted recovery information for use in recovering said other keys.

34. The method of claim 32 in which said sender also transmits key-dependent recovery information used in conjunction with said non-key-specific recovery information to recover said encryption keys said receiver regenerating said encryption key from said key-dependent recovery information and said non-key-specific recovery information.

35. The method of claim 34 in which said key-dependent recovery information is generated by generating a key-specific recovery value from said non-key-specific recovery information and key-specific recovery information and generating said key-dependent recovery information from said key-specific recovery value and said encryption keys said receiver regenerating said encryption key by:
- regenerating said key-specific recovery value from said non-key-specific recovery information and said key-specific recovery information; and
- regenerating said encryption key from said regenerated key-specific recovery value and said key-dependent recovery information.

36. The method of claim 35 in which said key-dependent recovery information is generated by encrypting said encryption key with said key-specific recovery value, said receiver regenerating said encryption key by decrypting said key-dependent recovery information using said regenerated key-specific recovery value.

37. The method of claim 30 in which said step of decrypting said encrypted data comprises the steps of:
- determining whether said encrypted recovery information was correctly decrypted; and
- decrypting said encrypted data only if it is determined that said recovery information was correctly encrypted.

38. The method of claim 37 in which said encrypted recovery information includes a message authentication code, said step of determining whether said encrypted recovery information was correctly decrypted comprising the step of testing said message authentication code.

39. The method of claim 29 in which said sender and said receiver hold respective secret values from which corresponding public values are generated, said first shared secret value being generated from said secret value held by said sender and the public value generated from the secret value held by said receiver.

40. The method of claim 39 in which said first shared secret value is generated as:

$$u = g^{xy} \mod p,$$

where x is the secret value held by said sender, y is the secret value held by said receiver, p is a prime modulus, and g is a generator.

41. The method of claim 29 in which said first shared public value is generated as $g^u \mod p$, where u is said first shared secret value, p is a prime modulus, and g is a generator.

42. The method of claim 41 in which said additional shared secret value is generated as $$v = g^{au} \mod p,$$

where a is the secret value held by said trustee, u is said first shared secret value, p is said prime modulus, and g is said generator.

43. A program storage device readable by a machine, tangibly embodying a program of instructions executable by the machine to perform the method steps of claim 29.

44. In a system in which a sender encrypts data under an encryption key to generate encrypted data and transmits said encrypted data along with recovery information to a receiver via a communications channel, said system having a trustee for enabling the recovery of said encryption key using said recovery information, said sender and said receiver having a first shared secret value that is not shared with said trustee and a first shared public value generated from said first shared secret value, said trustee holding a secret value from which a corresponding public value is generated, said transmitted recovery information being encrypted using an additional shared secret value generated from said first shared secret value and the public value generated from the secret value held by said trustee, a method for regenerating said recovery information for said trustee, wherein said trustee performs the steps of:
- receiving said encrypted recovery information and said first shared public value;
- regenerating said additional shared secret value from said first shared public value and said secret value held by said trustee; and
- decrypting said encrypted recovery information using said regenerated additional shared secret value.

45. The method of claim 44 in which said trustee receives said encrypted recovery information and said first shared public value from a party seeking recovery of said encryption key.

46. The method of claim 44 in which said first shared public value is generated as $g^u \mod p$, where u is said first shared secret value, p is a prime modulus, and g is a generator.

47. The method of claim 46 in which said additional shared secret value is generated as $$v = g^{au} \mod p,$$

where a is the secret value held by said trustee, u is said first shared secret value, p is said prime modulus, and g is said generator.

48. The method of claim 44 in which said trustee performs the further step of:
- revealing said decrypted recovery information to a party seeking recovery of said encryption key.

49. The method of claim 44 in which said trustee performs the further step of:

generating a recovery value from said decrypted recovery information;

revealing said recovery value to a party seeking recovery of said encryption key.

50. The method of claim 44 in which said recovery value is generated as a one-way function of said decrypted recovery information and additional recovery information specific to said encryption key.

51. The method of claim 44 in which said trustee receives said additional recovery information from a party seeking recovery of said encryption key.

52. The method of claim 44 in which said decrypted recovery information comprises non-key-specific recovery information usable to recover other keys.

53. The method of claim 52 in which said trustee caches said decrypted recovery information for use in recovering said other keys.

54. The method of claim 52 in which said sender also transmits key-dependent recovery information used in conjunction with said non-key-specific recovery information to recover said encryption key, said key-dependent recovery information being generated by generating a key-specific recovery value from said non-key-specific recovery information and key-specific recovery information and a generating said key-dependent recovery information from said key-specific recovery value and said encryption key, said trustee regenerating said key-specific recovery value from said non-key-specific recovery information and said key-specific recovery information.

55. The method of claim 54 in which said trustee presents said key-specific recovery value to a party seeking recovery of said encryption key while not revealing said non-key-specific recovery information.

56. A program storage device readable by a machine, tangibly embodying a program of instructions executable by the machine to perform the method steps of claim 44.

57. In a system in which a sender encrypts data under an encryption key to generate encrypted data and transmits said encrypted data along with recovery information to a receiver via a communications channel, said system having a trustee for enabling the recovery of said encryption key using said recovery information, said sender and said receiver having a first shared secret value that is not shared with said a trustee, said trustee holding a secret value from which a corresponding public value is generated, apparatus associated with said sender for making said recovery information available to said trustee, comprising:

means for generating a first shared public value from said first shared secret value;

means for generating an additional shared secret value from said first shared secret value and the public value generated from the secret value held by said trustee, means for encrypting said recovery information using said additional shared secret value generated for said trustee; and means for transmitting said encrypted recovery information to said receiver via said communications channel, said trustee being able to decrypt said recovery information by regenerating said additional shared secret value from said first shared public value and the secret value held by said trustee.

58. In a system in which a sender encrypts data under an encryption key to generate encrypted data and transmits said encrypted data along with recovery information to a receiver via a communications channel, said system having a trustee for enabling the recovery of said encryption key using said recovery information, said sender and said receiver having a first shared secret value that is not shared with said trustee and a first shared public value generated from said first shared secret value, said trustee holding a secret value from which a corresponding public value is generated, said transmitted recovery information being encrypted using an additional shared secret value generated from said first shared secret value and the public value generated from the secret value held by said trustee, apparatus within said receiver for regenerating said recovery information for said receiver, comprising:

means for receiving said encrypted recovery information;

means for generating said additional shared secret value from said first shared secret value and said public value generated from said secret value held by said trustee; and means for decrypting said encrypted recovery information using said additional shared secret value.

59. In a system in which a sender encrypts data under an encryption key to generate encrypted data and transmits said encrypted data along with recovery information to a receiver via a communications channel, said system having a trustee for enabling the recovery of said encryption key using said recovery information, said sender and said receiver having a first shared secret value that is not shared with said trustee and a first shared public value generated from said first shared secret value, said trustee holding a secret value from which a corresponding public value is generated, said transmitted recovery information being encrypted using an additional shared secret value generated from said first shared secret value and the public value generated from the secret value held by said trustee, apparatus associated with said trustee for regenerating said recovery information for said trustee, comprising:

means for receiving said encrypted recovery information and said first shared public value;

means for regenerating said additional shared secret value from said first shared public value and said secret value held by said trustee; and means for decrypting said encrypted recovery information using said regenerated additional shared secret value.

* * * * *

UNITED STATES PATENT AND TRADEMARK OFFICE
CERTIFICATE OF CORRECTION

PATENT NO. : 5,907,618

DATED : May 25, 1999

INVENTOR(S) : Gennaro et al.

It is certified that error appears in the above-identified patent and that said Letters Patent is hereby corrected as shown below:

Page 1, Abstract, line 3, after "receiver" and before "Each" insert --.--;
Page 1, Abstract, line 6 after "trustee" and before "The" insert --.--;
Column 3, line 47, delete "(attorney docket PO996104)"
Column 10, line 57, after "fields" and before "in", delete "502-502" and insert --506-508--.

Signed and Sealed this

Sixteenth Day of November, 1999

Attest:

Q. TODD DICKINSON

Attesting Officer

Acting Commissioner of Patents and Trademarks